Figure 1:
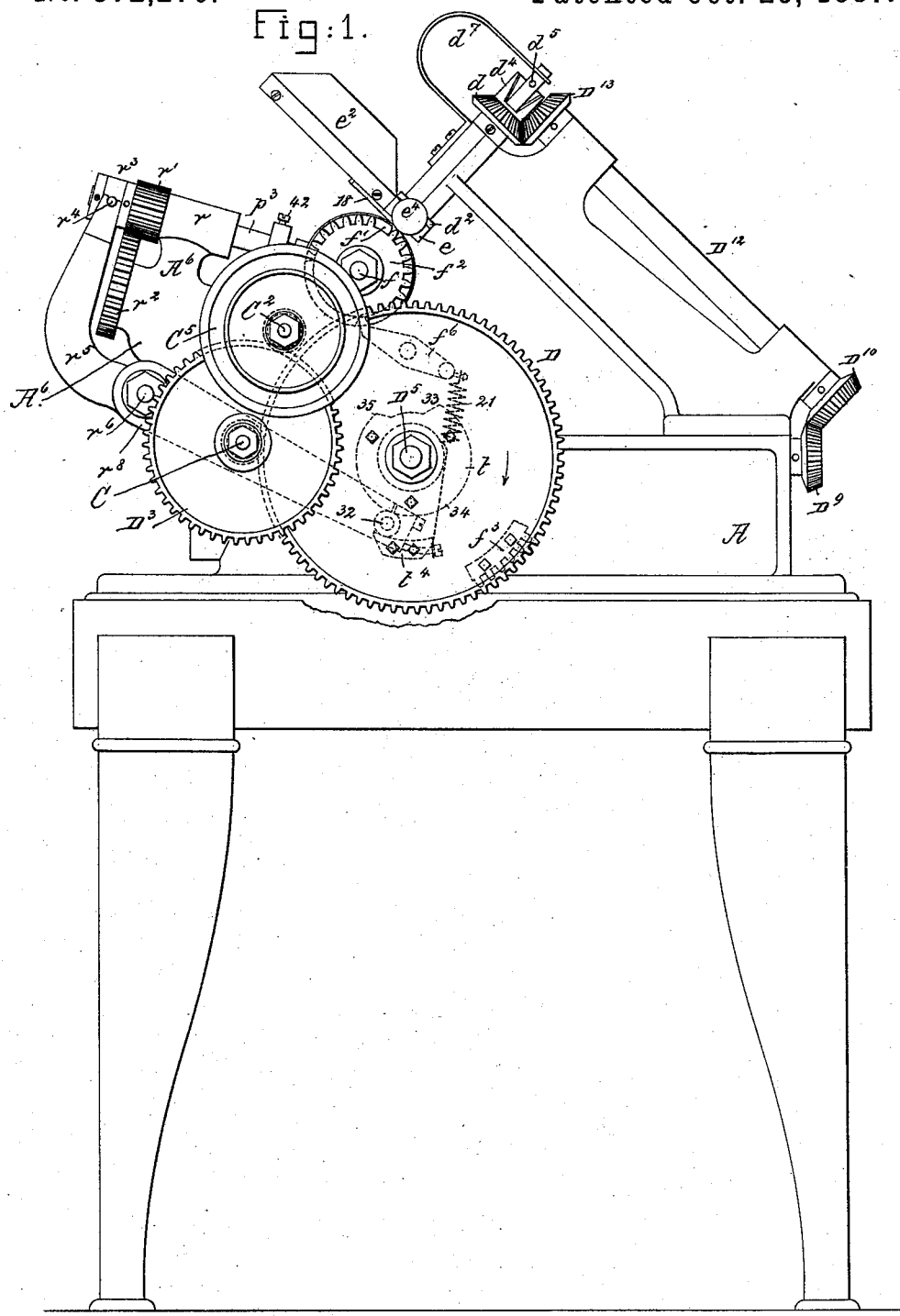

(No Model.) 3 Sheets—Sheet 1.

C. F. ROPER.
MACHINE FOR SHAPING HEADS OF SCREWS.

No. 372,276. Patented Oct. 25, 1887.

Witnesses.
Arthur Tipperton.
John F. C. Frankert.

Inventor.
Charles F. Roper,
by Crosby & Gregory
attys

N. PETERS, Photo-Lithographer, Washington, D. C.

(No Model.) 3 Sheets—Sheet 2.
C. F. ROPER.
MACHINE FOR SHAPING HEADS OF SCREWS.
No. 372,276. Patented Oct. 25, 1887.
Fig: 2.
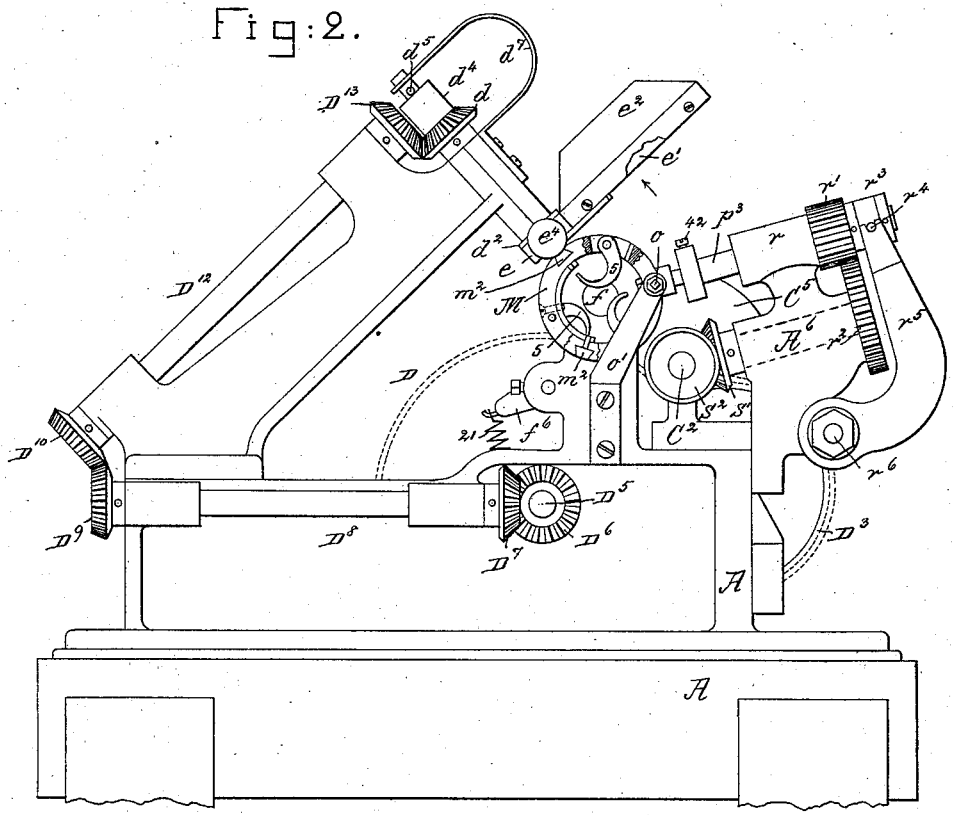
Fig: 3.
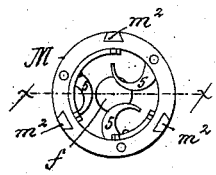
Fig: 7.
Fig: 6.
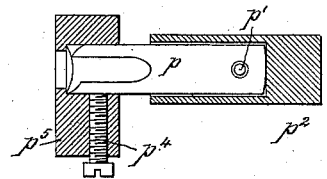
Fig: 4.
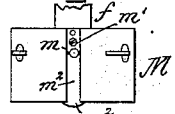
Fig: 8.
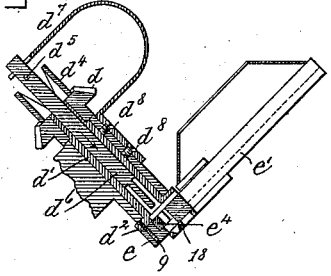
Fig: 9.
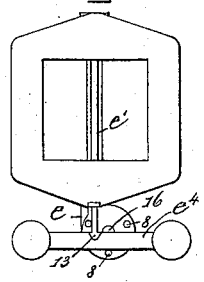
Fig: 5.
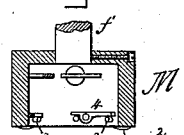
Witnesses.
Arthur Lippincott.
John F. C. Prindtork.
Inventor.
Charles F. Roper,
by Crosby Gregory attys
N. PETERS, Photo-Lithographer, Washington, D. C.

(No Model.) 3 Sheets—Sheet 3.
C. F. ROPER.
MACHINE FOR SHAPING HEADS OF SCREWS.
No. 372,276. Patented Oct. 25, 1887.
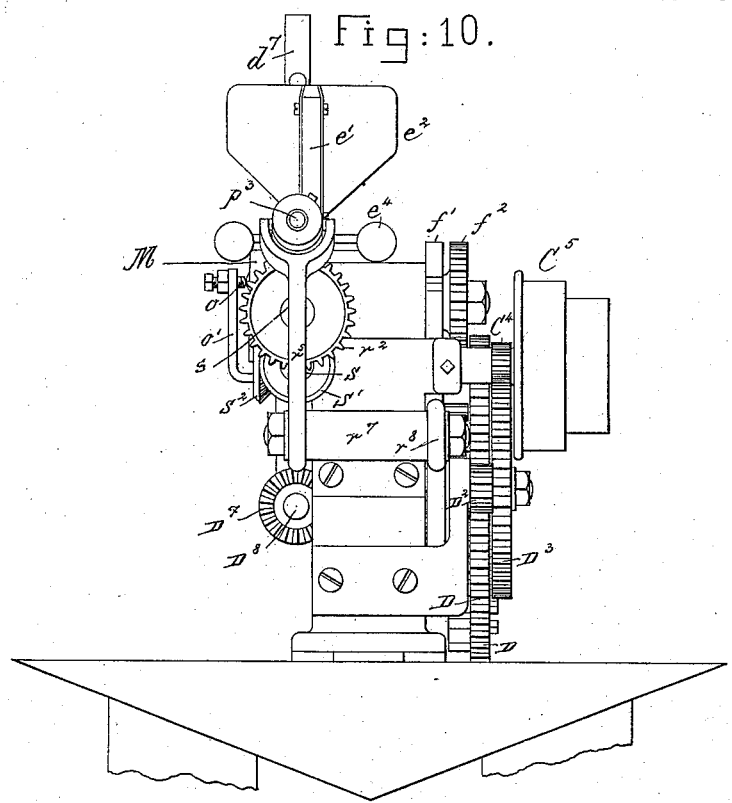
Fig: 10.
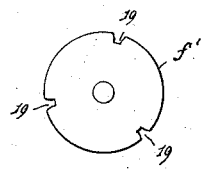
Fig: 11.
Witnesses.
Arthur Lipperlen.
John F. C. Printkert.
Inventor.
Charles F. Roper.
by Crosby & Gregory, Attys.

UNITED STATES PATENT OFFICE.

CHARLES F. ROPER, OF HOPEDALE, ASSIGNOR TO FREDERICK P. FISH, TRUSTEE, OF CAMBRIDGE, MASSACHUSETTS.

MACHINE FOR SHAPING HEADS OF SCREWS.

SPECIFICATION forming part of Letters Patent No. 372,276, dated October 25, 1887.

Application filed April 18, 1885. Serial No. 162,664. (No model.)

*To all whom it may concern:*

Be it known that I, CHARLES F. ROPER, of Hopedale, county of Worcester, and State of Massachusetts, have invented an Improvement in Machines for Shaping or Finishing the Heads of Screws or other Headed Blanks, of which the following description, in connection with the accompanying drawings, is a specification, like letters and figures on the drawings representing like parts.

This invention has for its object to provide a simple and efficient automatic machine by which to shape or finish the heads of screws or other headed blanks.

My invention consists, essentially, in a raceway to contain the screws or other headed blanks the heads of which are to be shaped, and a cut-off slide, and ejector, combined with an intermittingly-rotating holder provided with clamping-jaws to hold the said screws or other headed blanks, and with a rotating head-shaping tool, the said parts co-operating together, substantially as will be described, whereby one screw or other headed blank may be inserted into one clamp of the holder while the head-shaping tool is operating to shape the head of another screw or other blank previously inserted into another clamp of the said holder.

Other features of my invention will be hereinafter pointed out, and mentioned in the claims at the end of this specification.

Figure 1 is a rear side elevation representing a head shaping or finishing machine embodying my improvements. Fig. 2 is a front side elevation of Fig. 1; Fig. 3, a detail showing the holder in side elevation; Fig. 4, a top view of Fig. 3; Fig. 5, a section of Fig. 3 in the dotted line $x\,x$; Fig. 6, an enlarged sectional detail of the holder for the shaping-tool and its attached guide to center the tool on the head to be shaped, the tool being in elevation; Fig. 7, an end view of the cutter removed from the tool-holder; Fig. 8, a detail vertical section taken through the ejector, the revolving hopper being in elevation. Fig. 9 is a face view of the revolving hopper, looking at the same in the direction of the arrow, Fig. 2. Fig. 10 is a partial right-hand end view of Fig. 2, and Fig. 11 a detail view of the index-plate or locking-disk.

The frame-work A in suitable bearings supports the shaft $C^2$, provided with the cone-pulley $C^3$ and with a pinion, $C^4$. The pinion $C^4$ engages a toothed gear, $D^3$, having a connected pinion, $D^2$, both loose on a fulcrum-stud, C. The pinion $D^2$ engages a toothed gear, D, fast on a shaft, $D^5$, which by the bevel-gears $D^6$ $D^7$ $D^9$ $D^{10}$ and shafts $D^8$ $D^{12}$ rotates the bevel-gear $D^{13}$ in engagement with the bevel-gear $d$ on the tubular shaft $d'$, having the plate $d^2$. The plate $d^2$ has attached to it, by screws 9, (one of which is shown in Fig. 8,) the hub $e$ of the revolving raceway $e'$, having the hopper $e^2$ attached to it. The gear $d$ has an attached cam-hub, $d^4$, which receives against its end a pin, $d^5$, of an ejector, $d^6$, normally acted upon by a notched spring, $d^7$, the latter forcing the ejector against the head of a screw or other headed blank brought in line with the ejector whenever the pin $d^5$ is opposite the cam part of the said hub $d^4$. The raceway $e'$ at its under side has the yielding or spring arms 18. The screws or other headed blanks falling into the groove of the raceway enter one after the other the notch 13 in the cut-off slide $e^t$, when the latter is in position to place its notch opposite the inner end of the raceway, as in Fig. 9, and thereafter, in the revolution of the raceway, the cut-off slide is moved, preferably by gravity, carrying the screw or other blank opposite the notch 16 at the center of the hub $e$ of the raceway, after which the ejector is brought into operation. The shaft $f$ has fast on it the gear $f^2$ and the index-plate or locking-disk $f'$, engaged at times by the latch $f^6$, acted on by the spring 21. The sector $f^3$, fast on the side of the gear D, engages the gear $f^2$ and turns the same one-third of a rotation for each full rotation of the gear D.

The parts so far referred to by letter are common to my application Serial No. 162,665, to which reference may be had, wherein like parts are designated by like letters.

In this my present invention the holder M, fast on the shaft $f$, is rotated intermittingly by the sector $f^3$ and gear $f^2$, having, as herein shown, a tooth removed at three different points, so as to place the clamps of the said holder in position to have a screw or other headed blank placed therein by the ejector. The hopper, raceway, and ejector therein contained operate as do the like parts in my said application, so they need not be herein specifically described.

The screw or headed-blank holder M, composed of a hub attached to the shaft $f$, is slotted at its periphery in the direction of the length of the hub to receive a series of clamping-jaws, composed each of a fixed member, $m$, attached thereto by a screw, $m'$, and of a movable member, $m^2$, provided with a pin, 3, extended through a slot in the periphery of the hub and acted upon by a spring, 4, which normally keeps the movable member $m^2$ of the clamp sufficiently distant from the fixed member $m$ to permit the introduction of the shank of a screw or other headed blank between the said jaws directly from the raceway $e'$, the ejector acting upon the head of the said screw or blank. The hub of the holder has pivoted within it a number of punches, 5, which act by gravity as the holder is rotated, the ends of the said punches tapping against the points of the screws or other headed blanks and knocking them out from the holder. The shaft $f$, having fast on it the gear $f^2$ and locking-plate $f'$, is locked in position by the latch $f^6$, acted upon by the spring 21, the point of the said latch entering a notch or recess, 19, in the said plate.

A screw or other headed blank having been placed in the recess between the ends of the members of the clamping-jaws, the outer end of the movable member $m^2$, in the rotation of the holder, is brought against a screw or other projection, $o$, of spring-arm $o'$, attached to a rigid part of the frame-work, the said screw or projection acting to force the movable member $m^2$ of the clamping-jaws against the shank of the screw the head of which is to be acted upon, thus clamping and holding the same firmly while the holder M is at rest and while the head-shaping cutter, to be described, is made to act upon and shape or finish the head of the screw or other headed blank.

The head shaping cutter $p$ is pivoted loosely, by a pin, $p'$, in a socket-piece, $p^2$, inserted in the rotating spindle $p^3$, and there held by a suitable set-screw, 42. The head-shaping cutter $p$ has attached to it, by a screw, $p^4$, a guide, $p^5$, which is made to pass upon and surround the head of the screw or other blank to be shaped before the toothed end (see Figs. 6 and 7) of the cutter $p$ meets the head of the said screw or other blank. The spindle $p^3$ is extended into and through a sleeve or bearing, $r$, forming part of a bracket, $A^6$, attached to the framework A. The spindle $p^3$ has fast on it, near its upper end, an elongated pinion, $r'$, the teeth of which are engaged by a toothed gear, $r^2$, the extreme upper end of the said spindle having pinned to it an annularly-grooved collar, $r^3$, which is embraced by a yoke, $r^4$, having two pins or studs which are engaged by notches in the forked upper end of an arm, $r^5$, of a rock-shaft, $r^6$, placed in a bearing, $r^7$, the said rock-shaft at its opposite end having an attached arm, $r^8$, (shown best by dotted lines, Fig. 1,) the said arm having a roller-stud, 32, which is acted upon by the cam $t$ which from its point 33 along the line 34 to its heel 35 is slightly scroll-shaped, to thus enable the tool $p$ to be gradually forced upon and made to cut or shape the head of the screw or other blank, a spring connected with the said arm acting to retract the spindle $p^3$ and its attached cutter $p$ when the depression in the said cam arrives opposite the roller or other stud.

The toothed gear $r^2$ is attached to a diagonal shaft, $s$, (see full lines, Fig. 10, and dotted lines, Fig. 2,) the said shaft at its lower end having fastened to it a bevel-gear, $s'$, that is engaged by a bevel-gear, $s^2$, fast on the end of the shaft $C^2$. The gear D also has fast on it the cam-plate $t^1$, which at the proper time releases the latch $f^6$ from the plate $f'$, so that the sector $f^3$, when its teeth arrive in contact with the gear $f^2$, where one of its teeth is removed, will rotate the said gear and shaft $f$, then free to be turned for one-third of a rotation, at which time the latch will again engage the plate $f'$.

The ejector places a screw or other headed blank between the ends of the clamp members while they are separated under the action of the spring 4, and while a screw or other blank is being placed between one pair of clamps another pair of clamps closed firmly upon the shank of another screw or headed blank holds it while the head-shaping cutter $p$ finishes or shapes the said head, the blank so operated upon being subsequently discharged from between the clamps of the holder before the clamp in the intermitting rotation of the holder again arrives in position opposite the hub of the raceway and the ejector.

The pinion $r'$ is made long, so that it may be retained in engagement with the gear $r^2$ when the spindle $p^3$ is reciprocated by the arm $r^5$, the spindle being reciprocated intermittingly to enable the cutter to act upon and then retire from the head, the spindle and cutter being rotated continuously by the gear $r^2$. The guide $p^5$, fitting the cylindrical sides of the head of the screw or other blank before the cutter $p$ commences to shape or finish the said head, compels the cutter to act uniformly upon the head.

In another application, Serial No. 162,665, I have shown and claimed the revolving hopper, raceway, and ejector, and claim to such devices or elements is not herein made separately.

I claim—

1. In a machine for shaping or finishing the heads of screws or other headed blanks, the intermittingly-rotating holder provided with two or more pairs of clamps, and a spindle and cutter, $p$, to act upon the head of the said screw or blank to shape or finish it, combined with a punch or ejector, 5, to act upon and discharge the said blank from the holder after its head has been shaped and finished, substantially as described.

2. The intermittingly-operated holder provided with one or more pairs of clamps, and the tool $p$ and its attached guide to embrace the head of the screw or blank to be finished, combined with the spindle $p^3$, the gears $r'$ and $r^2$, and with the arm $r^5$, connected with and operating the spindle, substantially as described.

3. The intermittingly-rotating holder provided with one or more pairs of clamps, combined with a spring-arm and projection to cause the movable member of the clamp to be moved toward the fixed member to grasp the shank of the screw or other blank placed between them, substantially as described.

4. The intermittingly-rotating holder provided with two or more pairs of clamps, combined with a spring-arm and projection to cause the movable member of the clamp to be moved toward the fixed member to grasp the shank of the screw or other blank placed between them, and with the punches to effect the removal of the screws or blanks from the said holder, substantially as described.

5. The intermittingly-operated holder provided with two or more pairs of clamps, combined with the spindle $p^3$, the cutter $p$, pinion $r'$, gear $r^2$, arm $r^5$, shaft $r^4$, arm $r^3$, and a cam to move it, the said cutter being rotated continuously and reciprocated intermittingly, for the purpose set forth.

6. The holder and its clamp to hold a screw or other blank, and the rotating spindle, and the loosely-pivoted cutter $p$, rotated by the said spindle, combined with the guide attached to the said cutter, to operate substantially as described.

In testimony whereof I have signed my name to this specification in the presence of two subscribing witnesses.

CHARLES F. ROPER.

Witnesses:
F. J. DUTCHER,
R. A. COOKE.